United States Patent
Park et al.

(10) Patent No.: US 8,194,578 B2
(45) Date of Patent: Jun. 5, 2012

(54) SYSTEM AND METHOD FOR TRANSMITTING/RECEIVING MULTICAST/BROADCAST SIGNAL IN A COMMUNICATION SYSTEM

(75) Inventors: Dong-Soo Park, Seoul (KR); Ki-Back Kim, Seongnam-si (KR); Hae-Jung Lim, Seoul (KR); Jin-Han Song, Seoul (KR); Jae-Woo Kwon, Suwon-si (KR); Eun-Chan Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1005 days.

(21) Appl. No.: 11/872,341

(22) Filed: Oct. 15, 2007

(65) Prior Publication Data

US 2008/0089265 A1    Apr. 17, 2008

(30) Foreign Application Priority Data

Oct. 15, 2006  (KR) .................. 10-2006-0100091
Jan. 30, 2007  (KR) .................. 10-2007-0009247
Jan. 31, 2007  (KR) .................. 10-2007-0009979

(51) Int. Cl.
    *H04H 20/71* (2008.01)
(52) U.S. Cl. ......... 370/312; 370/254; 370/328; 370/401
(58) Field of Classification Search .................. 370/312, 370/329, 338, 350, 342, 356, 465, 519, 335, 370/254, 328, 401; 455/418, 436, 466, 502, 455/255; 709/226

See application file for complete search history.

(56) References Cited

U.S. PATENT DOCUMENTS

| | | | |
|---|---|---|---|
| 6,058,422 A * | 5/2000 | Ayanoglu et al. | 709/226 |
| 6,493,539 B1 | 12/2002 | Falco et al. | |
| 6,678,510 B2 * | 1/2004 | Syrjarinne et al. | 455/255 |
| 7,515,616 B2 * | 4/2009 | Yi et al. | 370/519 |
| 7,751,820 B2 | 7/2010 | Ishii et al. | |
| 2001/0018341 A1 * | 8/2001 | Dao et al. | 455/418 |
| 2003/0002525 A1 * | 1/2003 | Grilli et al. | 370/465 |
| 2003/0147362 A1 | 8/2003 | Dick et al. | |

(Continued)

FOREIGN PATENT DOCUMENTS

CN         1496139         5/2004

(Continued)

OTHER PUBLICATIONS

3rd Generation Partnership Project; Technical Specification Group Radio Access Network; Feasibility Study for Evolved Universal Terrestrial Radio Access (UTRA) and Universal Terrestrial Radio Access Network (UTRAN)—Release 7, Jun. 2006.

3rd Generation Partnership Project; Technical Specification Group Radio Access Network; Physical Layer Aspects for Evolved Universal Terrestrial Radio Access (UTRA)—Release 7, Jun. 2006.

(Continued)

*Primary Examiner* — Hassan Kizou
*Assistant Examiner* — Toan Nguyen
(74) *Attorney, Agent, or Firm* — The Farrell Law Firm, P.C.

(57) ABSTRACT

A system and method for transmitting/receiving a multicast/broadcast signal in a communication system are provided, in which if the communication system includes at least one zone to which the same service is provided and the zone includes at least one ASN_GW and at least one BS connected to the ASN_GW, the ASN_GW generates a second multicast/broadcast signal using a received first multicast/broadcast signal according to information about the zone, generates time information indicating a time when the BS is to transmit the second multicast/broadcast signal, and transmits the second multicast/broadcast signal and the time information to the BS.

30 Claims, 14 Drawing Sheets

U.S. PATENT DOCUMENTS

| | | |
|---|---|---|
| 2004/0022218 A1 | 2/2004 | Kim et al. |
| 2005/0094618 A1 | 5/2005 | Colban et al. |
| 2006/0146745 A1 | 7/2006 | Cai et al. |
| 2006/0154679 A1* | 7/2006 | Chang .......................... 455/502 |
| 2006/0198377 A1 | 9/2006 | Kubota |
| 2007/0133478 A1* | 6/2007 | Armbruster et al. .......... 370/335 |
| 2007/0213078 A1* | 9/2007 | Shaheen ....................... 455/466 |
| 2007/0217400 A1* | 9/2007 | Staples ......................... 370/356 |
| 2008/0056219 A1* | 3/2008 | Venkatachalam ............. 370/342 |
| 2008/0084837 A1 | 4/2008 | Watanabe et al. |
| 2008/0095071 A1* | 4/2008 | Lu et al. ....................... 370/254 |
| 2008/0268844 A1* | 10/2008 | Ma et al. ...................... 455/436 |
| 2009/0046637 A1* | 2/2009 | Kim et al. .................... 370/329 |

FOREIGN PATENT DOCUMENTS

| | | |
|---|---|---|
| JP | 2000-134667 | 5/2000 |
| JP | 2001-069559 | 3/2001 |
| JP | 2005-348154 | 12/2005 |
| JP | 2006-081200 | 3/2006 |
| JP | 2006-245839 | 9/2006 |
| JP | 2007-525914 | 9/2007 |
| JP | 2008-098758 | 4/2008 |
| WO | WO 2005/096548 | 10/2005 |

* cited by examiner

SYSTEM AND METHOD FOR TRANSMITTING/RECEIVING MULTICAST/BROADCAST SIGNAL IN A COMMUNICATION SYSTEM

PRIORITY

This application claims priority under 35 U.S.C. §119(a) to a Korean Patent Application filed in the Korean Intellectual Property Office on Oct. 15, 2006 and assigned Serial No. 2006-100091, a Korean Patent Application filed in the Korean Intellectual Property Office on Jan. 30, 2007 and assigned Serial No. 2007-9247, and a Korean Patent Application filed in the Korean Intellectual Property Office on Jan. 31, 2007 and assigned Serial No. 2007-9979, the entire disclosure of each of which is hereby incorporated by reference.

BACKGROUND OF THE INVENTION

1. Field of the Invention

The present invention generally relates to a system and method for transmitting/receiving a signal in a communication system. More particularly, the present invention relates to a system and method for transmitting/receiving a multicast/broadcast signal in a communication system.

2. Description of the Related Art

Future-generation communication systems are under development to provide a variety of high-speed large-data services to Mobile Stations (MSs). A major example of the future-generation communication systems is Mobile Worldwide Interoperability for Microwave Access (WiMAX). The Mobile WiMAX communication system complies with the Institute of Electrical and Electronics Engineers (IEEE) 802.16 standards.

A main service that the future-generation communication systems seek to provide is Multicast/Broadcast Service (MBS). Although active research is being conducted on the Mobile WiMAX communication system, Mobile WiMAX operations are yet to be specified. There are no specified MBS operating procedures, either.

SUMMARY OF THE INVENTION

An aspect of exemplary embodiments of the present invention is to address at least the problems and/or disadvantages described herein and to provide at least the advantages described below. Accordingly, an aspect of exemplary embodiments of the present invention is to provide a system and method for transmitting/receiving a multicast/broadcast signal in a communication system.

In accordance with an aspect of exemplary embodiments of the present invention, there is provided a method for transmitting/receiving a multicast/broadcast signal in an Access Service Network GateWay (ASN_GW) in a communication system, in which when the communication system includes at least one zone to which the same service is provided and the zone includes at least one ASN_GW and at least one Base Station (BS) connected to the ASN_GW, the ASN_GW generates a second multicast/broadcast signal using a received first multicast/broadcast signal according to information about the zone, generates time information indicating a time when the BS is to transmit the second multicast/broadcast signal, and transmits the second multicast/broadcast signal and the time information to the BS.

In accordance with another aspect of exemplary embodiments of the present invention, there is provided a method for transmitting/receiving a multicast/broadcast signal in a BS in a communication system, in which when the communication system includes at least one zone to which the same service is provided and the zone includes at least one ASN_GW and at least one BS connected to the ASN_GW, the BS receives a multicast/broadcast signal and time information from the ASN_GW, the time information indicating a time when the BS is to transmit the multicast/broadcast signal, and transmits the multicast/broadcast signal according to the time information.

In accordance with a further aspect of exemplary embodiments of the present invention, there is provided a system for transmitting/receiving multicast/broadcast signals in a communication system, which includes an ASN_GW. When the communication system includes at least one zone in which the same service is provided and the zone includes at least one ASN_GW and at least one BS connected to the ASN_GW, the ASN_GW generates a second multicast/broadcast signal using a received first multicast/broadcast signal according to information about the zone, generates time information indicating a time when the BS is to transmit the second multicast/broadcast signal, and transmits the second multicast/broadcast signal and the time information to the BS.

In accordance with still another aspect of exemplary embodiments of the present invention, there is provided a system for transmitting/receiving multicast/broadcast signals in a communication system, which includes a BS. If the communication system includes at least one zone to which the same service is provided and the zone includes at least one ASN_GW and at least one BS connected to the ASN_GW, the BS receives from the ASN_GW a multicast/broadcast signal and time information indicating a time when the BS is to transmit the multicast/broadcast signal, and transmits the multicast/broadcast signal according to the time information.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a system and method for transmitting/receiving a multicast/broadcast signal in a communication system. While the following description is made in the context of a Mobile Worldwide Interoperability for Microwave Access (WiMAX) communication system and a Multicast/Broadcast Service (MBS) signal as a multicast/broadcast signal, it is a mere exemplary application. Herein, the MBS can be called as MCBCS. Thus, it is to be clearly understood that the present invention is also applicable to other communication systems and other types of multicast/broadcast signals.

A brief description will first be made of a method for transmitting/receiving an MBS signal after performing timing synchronization in the Mobile WiMAX communication system according to the present invention.

In the Mobile WiMAX communication system supporting MBS, if a plurality of Base Stations (BSs) transmit the same MBS signal in the same frequency, a receiving MS can achieve a combining diversity gain, i.e. macro diversity. Herein, the BS can be a Radio Access Station (RAS). The process in which the MS achieves the macro diversity will be described below.

The channel environment of the Mobile WiMAX communication system continuously changes over time according to the locations and velocities of the MSs due to multipath fading, shadowing, etc. Inter-cell interference becomes severe as the MSs approach a cell edge region.

In accordance with the present invention, an MBS zone is defined by at least one BS that provides the same MBS to the MSs. Herein, the BS is connected with an Access Service Network GateWay (ASN_GW), the ASN_GW can be an Access Control Router (ACR). Eventually, BSs within the same MBS zone transmit the same MBS signals. Even then, without timing synchronization between the MBS signals, it is impossible for a receiving MS to achieve macro diversity.

To avert this problem, the BSs in the same MBS zone synchronize the timings of their MBS signals to one another so that the MS can achieve a macro diversity gain. For the timing synchronization, the BSs use time stamps in order to transmit the same MBS signals at the same time. The time stamps are information about time points when the BSs are to transmit MBS signals. In accordance with the present invention, an MBS server or an ASN_GW is responsible for generating time stamps. Herein, the MBS server can be called as an MCBCS Network Server.

Figure 1:
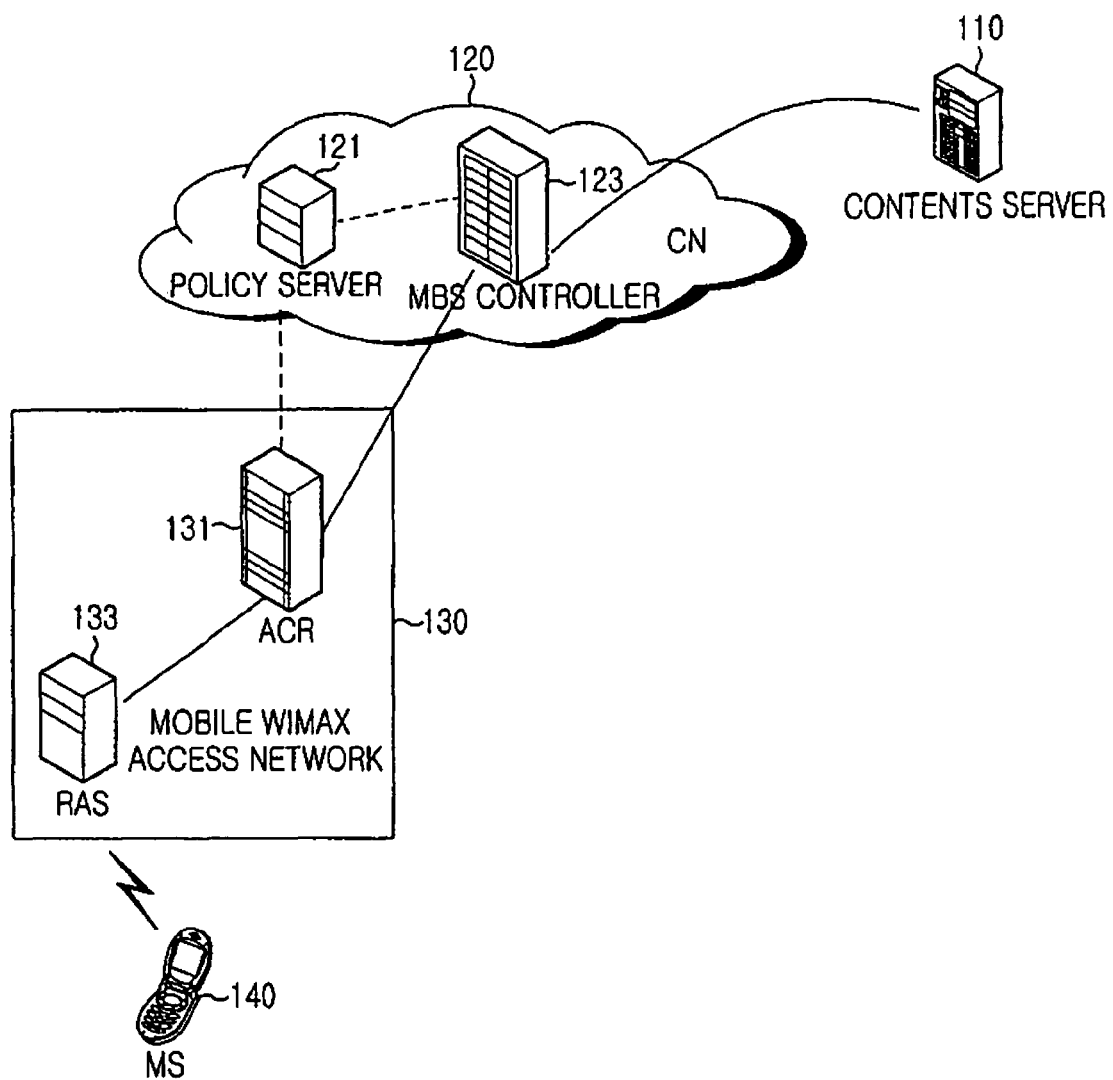
FIG. 1 illustrates the configuration of a Mobile WiMAX communication system according to an exemplary embodiment of the present invention.

FIG. 1 illustrates a configuration of the Mobile WiMAX communication system according to an exemplary embodiment of the present invention.

Referring to FIG. 1, the Mobile WiMAX communication system includes a content server 110, a Core Service Network (CSN) 120, a Mobile WiMAX access network 130, and an MS 140. Herein, the content server 110 can be called as an MCBCS Application server, and can be located out of the CSN 120. The CSN 120 has a policy server 121 and an MBS server 123. The Mobile WiMAX access network 130 includes an ASN_GW 131 and a BS 133.

The content server 110 manages content. Being connected to the MBS server 123, the content server 110 provides content to the MBS server 123 when the MBS server 120 needs the content. The policy server 121 manages Quality of Service (QoS) profile information for each Internet Protocol (IP) flow. Upon receipt of an MBS request from the MS 140 through the MBS server 123, the policy server 121 notifies the ASN_GW 131 that the MBS is triggered for the MS 140 by a predetermined interfacing scheme, for example, Diameter or Common Open Policy Service (COPS). The operation of the policy server 121 is outside of the scope of the present invention and thus its detailed description is not provided herein.

The MBS server 123, which is connected to the content server 110 and the policy server 121, provides an MBS signal received from the content server 110 to the ASN_GW 131 and, upon receipt of the MBS request of the MS 140 from the ASN_GW 131, notifies the policy server 121 accordingly. In accordance with the present invention, the MBS server 123 can generate time stamps for the MBS. An operation for generating time stamps for an MBS in the MBS server 123 and an MBS signal transmission/reception based on the time stamps will be described later in detail.

The ASN_GW 131 manages connectivity and mobility of the MS 140 and generates a unique service flow for each uplink/downlink connection. Also, when notified of the MBS triggering for the MS 140 from the policy server 121, the ASN_GW 131 creates a service flow for providing the MBS to the MS 140. In the present invention the ASN_GW 131 may generate time stamps for the MBS. An operation for generating time stamps for an MBS in the ASN_GW 131 and an MBS signal transmission/reception based on the time stamps will be described later in detail.

The ASN_GW 131 selects at least one BS, requests the selected BS to transmit ToD information (e.g. 09:13:34, Oct. 25, 2006) and receives the ToD information from the BS. While it is described herein that the ASN_GW 131 selects one BS that will transmit ToD information, it is to be appreciated that the ASN_GW 131 may select two or more BSs to transmit ToD information in order to improve the reliability of the ToD information. In this case, the ASN_GW 131 decides final ToD information using all of the ToD information received from the two or more BSs, thereby increasing the accuracy of the ToD information.

The ASN_GW 131 determines an FN to be allocated to MBS signals using the ToD information so that all BSs within an MBS zone can transmit the MBS signals with timing synchronization among the MBS signals. The ToD information and the FN will be detailed later. The ASN_GW 131 also performs packetization operation for the MBS signals using RF scheduling information about the MBS signals. The RF scheduling information may include information about a Modulation and Coding Scheme (MCS) level of each BS, an available burst size of two-dimensions, i.e. time-frequency allocation, and Medium Access Control (MAC) QoS information, a time stamp, a transmission period, and a Modulation and Coding Scheme (MCS) level for an MBS signal. The RF scheduling information will be described later in great detail.

The BS 133 is connected to the ASN_GW 131 and wirelessly to the MS 140. The BS 133 provides wireless connectivity to the MS 140 and performs scheduling based on MAC QoS information. Upon receipt of a ToD request from the ASN_GW 131, the BS 133 transmits ToD information to the ASN_GW 131. The BS 133 includes a device for acquiring absolute ToD information, for example, a Global Positioning System (GPS) receiver.

While it is shown in FIG. 1 that the Mobile WiMAX access network 130 includes one ASN_GW 131 and one BS 133, it is clear that it may include a plurality of ASN_GWs and each ASN_GW may include a plurality of BSs.

Figure 2:
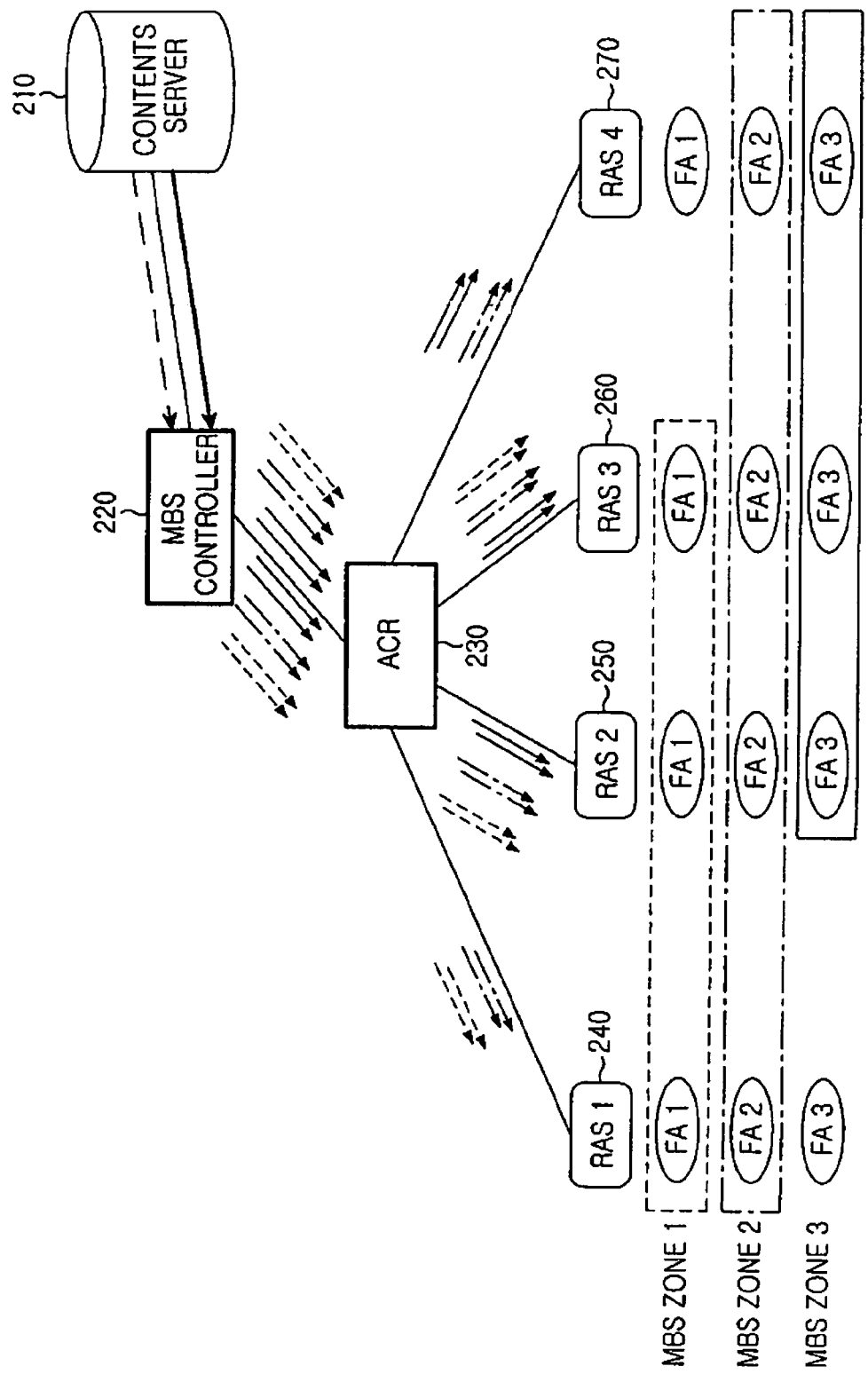
FIG. 2 illustrates MBS signal flows during transmission/reception of MBS signals, when an MBS server generates time stamps in the Mobile WiMAX communication system according to an exemplary embodiment of the present invention.

FIG. 2 illustrates MBS signal flows during transmission/reception of MBS signals, when an MBS server generates time stamps in the Mobile WiMAX communication system according to an exemplary embodiment of the present invention.

Before describing FIG. 2, it is noted that the MBS server generates time stamps and BSs acquire timing synchronization using the time stamps and transmit MBS signals, so that a receiving MS can achieve a macro diversity gain.

Referring to FIG. 2, a content server 210 provides content to an MBS server 220. The MBS server 220 transmits the content, i.e. MBS signals to an ASN_GW 230 according to information about its managed MBS zones. Notably, the MBS server 220 includes time stamps in the MBS signals. MBS signals with time stamps are referred to as "time stamp-MBS signals".

It is assumed that the MBS server 220 manages three MBS zones, MBS zone 1, MBS zone 2, and MBS zone 3. MBS zone 1 covers first, second and third BSs 240, 250 and 260 (BS 1, BS 2 and BS 3), MBS zone 2 covers BS 1, BS 2, BS 3, and a fourth BS 270 (BS 4), and MBS zone 3 covers BS 2, BS 3 and BS 4. First, second and third Frequency Assignments (FAs), FA 1, FA 2, and FA 3, are each available to BS 1 to BS 4. BS 1 to BS 4 are connected to the ASN_GW 230.

To enable an MBS-receiving MS to achieve a macro diversity gain, the MBS server 220 generates a time stamp on an MBS zone basis. That is, since an MBS service with an MBS IDentifier (ID) can be provided to different MBS zones using different MBS Connection IDs (MCIDs), the MBS server 220 creates as many copies of the content received from the content server 210 as the number of MBS zones. For example, if the MBS server 220 receives content with two MBS IDs, MBS ID1 and MBS ID2, the MBS server 220 copies the content with MBS ID1 and the content with MBS ID2 and multiplexes the copies for each MBS zone. Then the MBS server 220 generates a time stamp for the multiplexed MBS signal of each MBS zone and transmits the multiplexed MBS signals with the time stamps to the ASN_GW 230.

The ASN_GW 230 transmits the time-stamp MBS signals to the BSs in the respective MBS zones. Specifically, the ASN_GW 230 transmits time stamp-MBS signals for MBS zone 1 and MBS zone 2 to BS 1 since BS 1 is covered by MBS zone 1 and MBS zone 2. The ASN_GW 230 transmits time stamp-MBS signals for MBS zone 1, MBS zone 2, and MBS zone 3 to BS 2 and BS 3 since BS 2 and BS 3 are covered by MBS zone 1, MBS zone 2, and MBS zone 3. Finally, the ASN_GW 230 transmits time stamp-MBS signals for MBS zone 2 and MBS zone 3 to BS 4 since BS 4 is covered by MBS zone 2 and MBS zone 3.

Each of BS 1 to BS 4 transmits the received time stamp-MBS signals at time points indicated by the time stamps, so that the MS can achieve a macro diversity gain.

Figure 3:
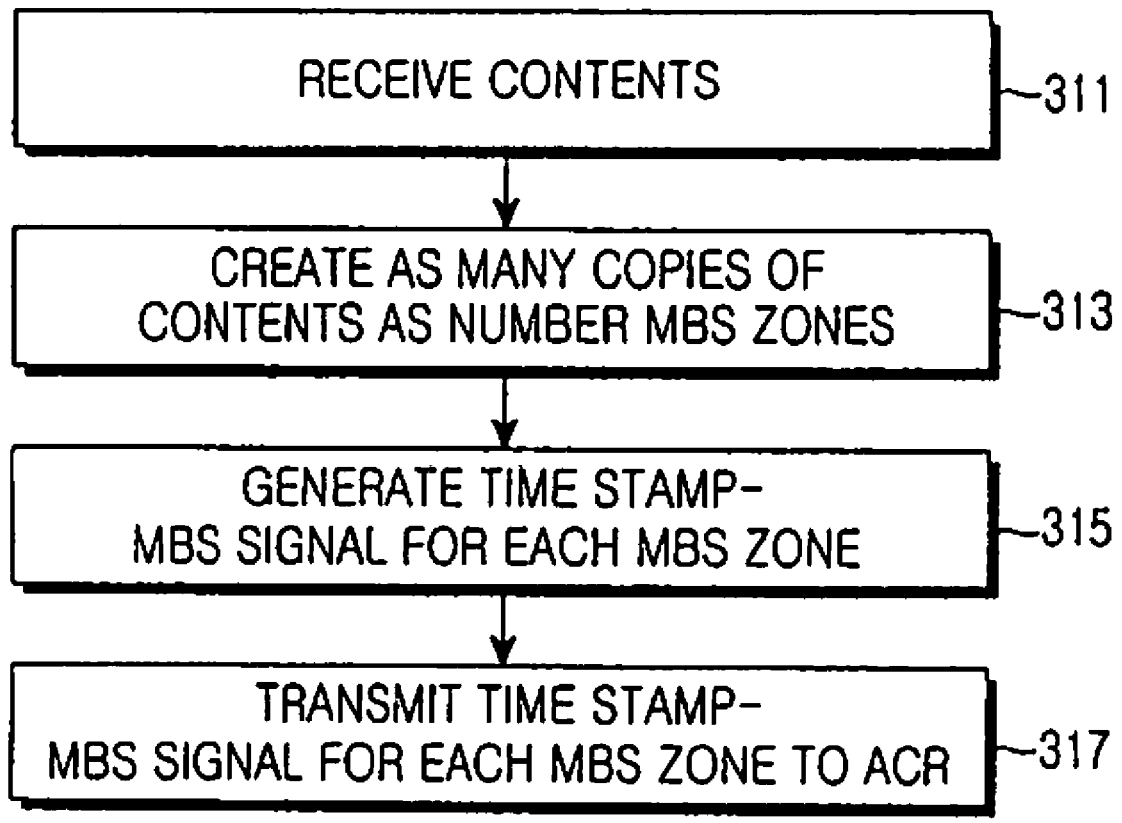
FIG. 3 is a flowchart of an operation of the MBS server illustrated in FIG. 2.

FIG. 3 is a flowchart of the operation of the MBS server 200 illustrated in FIG. 2.

Referring to FIG. 3, the MBS server 220 receives content from the content server 210 in step 311 and creates as many copies of the content as the number of MBS zones in step 313. In step 315, the MBS server 220 generates MBS signals for the respective MBS zones using the copies and generates time stamps for the MBS signals on an MBS zone basis. The MBS server 220 transmits the time stamp-MBS signals for the respective MBS zones to the ASN_GW 230 in step 317.

When the MBS server generates time stamps as illustrated in FIGS. 2 and 3, the Mobile WiMAX communication system may face the following problems.

(1) As the MBS server generates time stamps on an MBS zone basis, the MBS server creates as many copies of content as the number of MBS zones and transmits them to the ASN_GW. The total amount of transmission between the MBS server and the ASN_GW increases rapidly with the number of content copies, thereby imposing overload on the interface between the MBS server and the ASN_GW and causing a memory capacity waste to the ASN_GW.

(2) For multiplexing MBS signals on an MBS zone basis, the ASN_GW should transmit RF scheduling information to the MBS server. If the MBS server is an entity independent of the Mobile WiMAX communication system, the transmission of RF scheduling information about each BS from the ASN_GW to the MBS server is not preferred.

(3) A time stamp indicates a time at which a BS is to transmit an MBS signal. Therefore, a time stamp that the MBS server generates with respect to a current time should be generated taking into account a latency involved in signal transmission from the MBS server to the BS. However, considering that the transmission path from the MBS server to the BS is long and each transmission path involves uncertainty, it is difficult for the MBS server to generate a time stamp by compensating for the latency.

In this context, the present invention proposes a method for generating time stamps for an MBS by the ASN_GW and transmitting MBS signals after timing synchronization based on the time stamps by the BSs in order to allow the MS to achieve a macro diversity gain.

Figure 4:
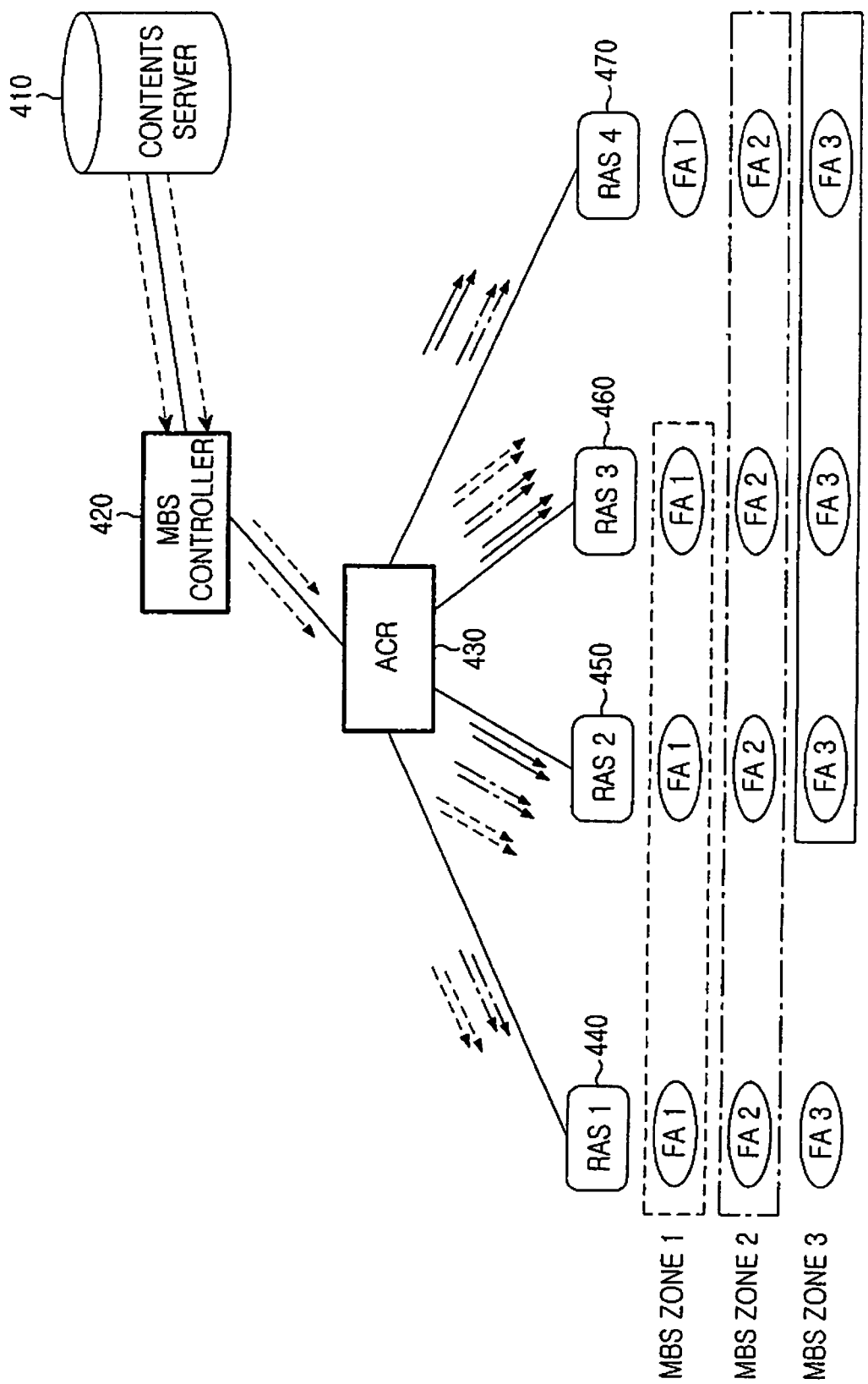
FIG. 4 illustrates MBS signal flows during transmission/reception of MBS signals, when an Access Service Network GateWay (ASN_GW) generates time stamps in the Mobile WiMAX communication system according to an exemplary embodiment of the present invention.

FIG. 4 illustrates MBS signal flows during transmission/reception of MBS signals, when the ASN_GW generates time stamps in the Mobile WiMAX communication system according to an exemplary embodiment of the present invention.

Referring to FIG. 4, a content server 410 provides content to an MBS server 420. The MBS server 420 transmits the contents to an ASN_GW 430 according to information about MBS zones managed by it. It is assumed that the MBS server 420 manages three MBS zones, MBS zone 1, MBS zone 2, and MBS zone 3. MBS zone 1 covers first, second and third BSs 440, 450 and 460 (BS 1, BS 2 and BS 3), MBS zone 2 covers BS 1, BS 2, BS 3, and a fourth BS 470 (BS 4), and MBS zone 3 covers BS 2, BS 3 and BS 4. First, second and third FAs (FA 1, FA 2, and FA 3) are each available to BS 1 to BS 4. BS 1 to BS 4 are connected to the ASN_GW 430.

Because the MBS server 420 does not generate time stamps, the MBS server 420 simply transmits the contents received from the contents server 410 to the ASN_GW 430. The ASN_GW 430 generates MBS signals directed to the respective MBS zones using the contents and creates time stamps for the MBS signals. The ASN_GW 430 may receive the MBS zone information from the MBS server 420 or from any other entity (not shown). The reception of the MBS zone information at the ASN_GW 430 is beyond the scope of the present invention and thus will not be described herein.

The ASN_GW 430 transmits the time-stamp MBS signals to the BSs in the respective MBS zones. Specifically, the ASN_GW 430 transmits time stamp-MBS signals for MBS zone 1 and MBS zone 2 to BS 1 since BS 1 is covered by MBS zone 1 and MBS zone 2. The ASN_GW 430 transmits time stamp-MBS signals for MBS zone 1, MBS zone 2, and MBS zone 3 to BS 2 and BS 3 since BS 2 and BS 3 are covered by MBS zone 1, MBS zone 2, and MBS zone 3. Finally, the ASN_GW 430 transmits the time stamp-MBS signals for MBS zone 2 and MBS zone 3 to BS 4 since BS 4 is covered by MBS zone 2 and MBS zone 3.

Each of BS 1 to BS 4 transmits the received time stamp-MBS signals at time points indicated by the time stamps included in them, so that the MS can achieve a macro diversity gain.

Figure 5:
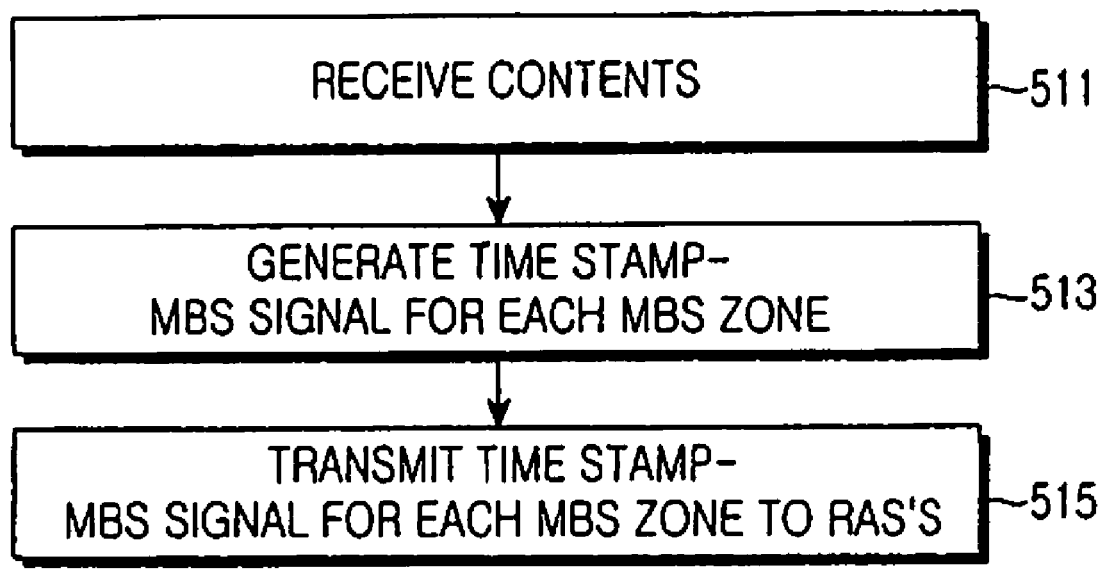
FIG. 5 is a flowchart of an operation of the ASN_GW illustrated in FIG. 4.

FIG. 5 is a flowchart of the operation of the ASN_GW 430 illustrated in FIG. 4.

Referring to FIG. 5, the ASN_GW 430 receives content from the MBS controller 420 in step 511 and generates MBS signals for the respective MBS zones using the content and creates time stamps for the respective MBS signals in step 513. The ASN_GW 430 transmits the time stamp-MBS signals for the respective MBS zones to the BSs in step 515.

As described with reference to FIGS. 4 and 5, the time stamp generation of the ASN_GW offers the following benefits, compared to the time stamp generation of the MBS server.

(1) In the case where the MBS server generates time stamps, the MBS server creates as many copies of contents as the number of MBS zones and transmits the content to the ASN_GW, thereby imposing overload on the interface between the MBS server and the ASN_GW. In contrast, when the ASN_GW is responsible for the time stamp generation, the ACK just copies content received from the content server only for MBS zones requiring the content. Therefore, the overhead is eliminated between the MBS server and the ASN_GW and the memory efficiency of the ASN_GW increases.

(2) In the case where the MBS server generates time stamps, the MBS server should acquire RF scheduling information about each BS from the ASN_GW. If the MBS server is an entity independent of the Mobile WiMAX communication system, the transmission of the RF scheduling information to the MBS server is not preferable in terms of information management. However, when the ASN_GW generates time stamps, there is no need for transmitting the RF scheduling information to the MBS server and it does not matter whether the MBS server is an entity independent of the Mobile WiMAX communication system.

(3) While it is difficult for the MBS server to generate a time stamp by compensating for the latency from the MBS server to the ASN_GW, the ASN_GW has only to generate time stamps by compensating for the latency from the ASN_GW to the BSs. Therefore, the time stamp generation is facilitated more in the ASN_GW than in the MBS server.

As stated before, for the MS to achieve a macro diversity gain, the BSs within the same MBS zone should transmit to the MS the same MBS signal at the same time. For this purpose, time stamps are used and timing synchronization between the ASN_GW and the BSs is significant to increasing the use efficiency of the time stamps. Therefore, the present invention proposes a method for acquiring timing synchronization between the ASN_GW and the BSs using ToD information managed by the BSs.

Figure 6:
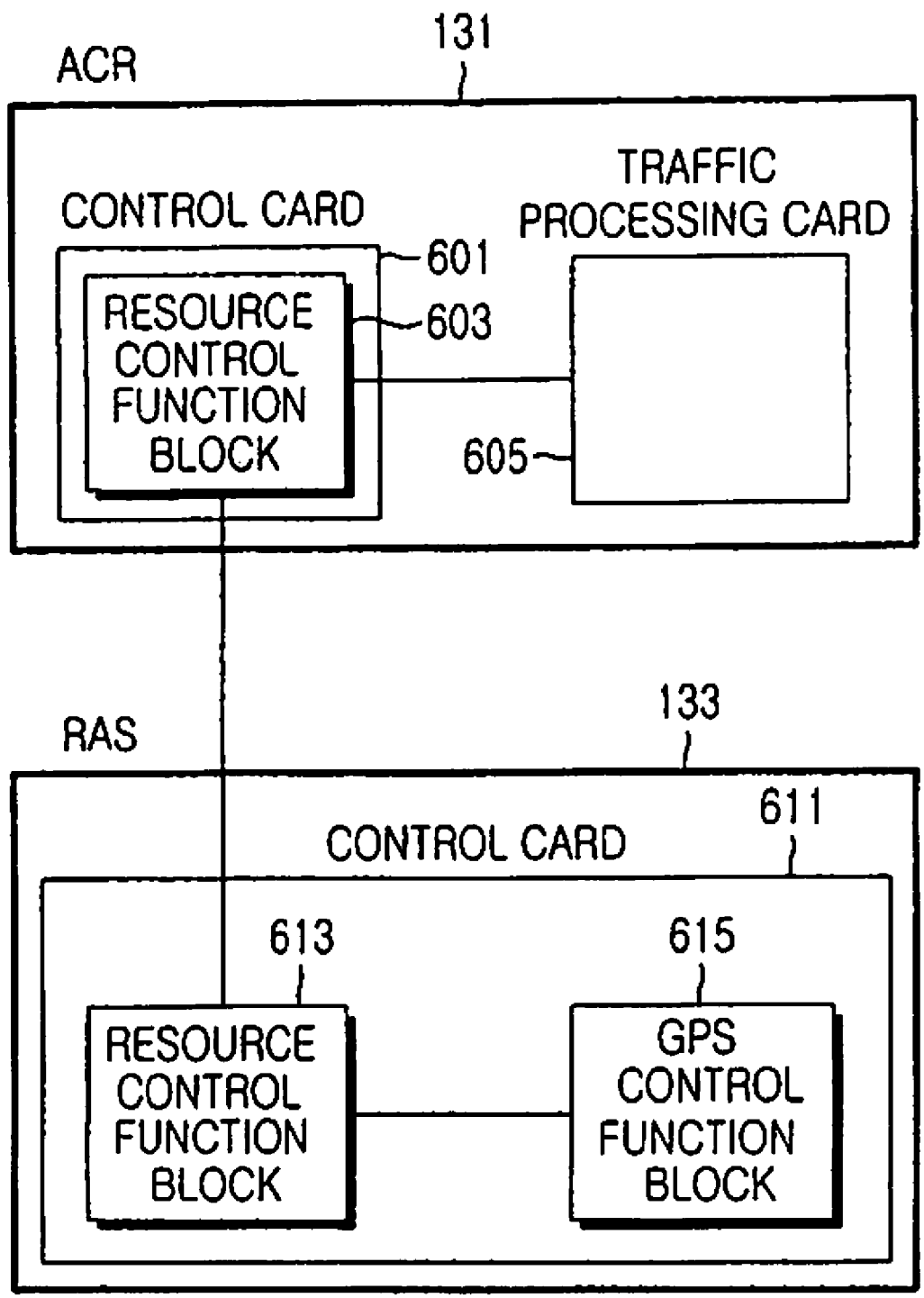
FIG. 6 is a block diagram of the ASN_GW and the BS illustrated in FIG. 1.

FIG. 6 is a block diagram of the ASN_GW 131 and the BS 133 illustrated in FIG. 1.

Referring to FIG. 6, the ASN_GW 131 includes a control card 601 and a traffic processing card 605. The BS 133 includes a control card 611. The control card 601 has a resource control function block 603, and the control card 611 has a resource control function block 613 and a GPS control function block 615. The following description of FIG. 6 is based in part on the assumption that ToD information is transmitted in a control message transmission path between the ASN_GW 131 and the BS 133. Compared to when ToD information is transmitted in a traffic transmission path, for example, the ToD information transmission in the control message transmission path has a shorter transmission delay and a less change in the transmission delay, thus increasing the transmission accuracy of the ToD information.

A description will first be made of an operation for requesting ToD information from the ASN_GW 131 to the BS 133.

The resource control function block 603 receives a normal operation notification message every predetermined period from every BS connected to the ASN_GW 131 and selects at least one of the BSs that operate normally to transmit ToD information. In the illustrated case of FIG. 6, the BS 133 is selected. The resource control function block 603 transmits an ACKnowledgment (ACK) message to the BS 133, indicating that the normal operation notification message has been successfully received from the BS 133 and requesting the BS 133 to transmit its managed ToD information to the ASN_GW 131. The ASN_GW 131 transmits conventional ACK messages without the ToD information request to the other BSs that transmitted the normal operation notification messages to the ASN_GW 131.

In the BS 133, the resource control function block 613 is aware from the received ACK message that the BS 133 has to transmit the ToD information to the ASN_GW 131 and requests the GPS control function block 615 to transmit the ToD information. Then the GPS control function block 615 transmits the ToD information to the ASN_GW 131. The ToD information is piggybacked onto a control message used for the ASN_GW 131 to manage the BS 133, for example, a normal operation notification message. The use of the existing control message obviates the need for establishing an additional path and does not cause an additional transmission overhead. As the ToD information is piggybacked onto the normal operation notification message rather than transmitted in a separately procured control message, the transmission period of the ToD information is equal to that of the normal operation notification message. Aside from the transmission of the ToD information in the normal operation notification message, the ToD information can be transmitted in a new control message.

Figure 7:
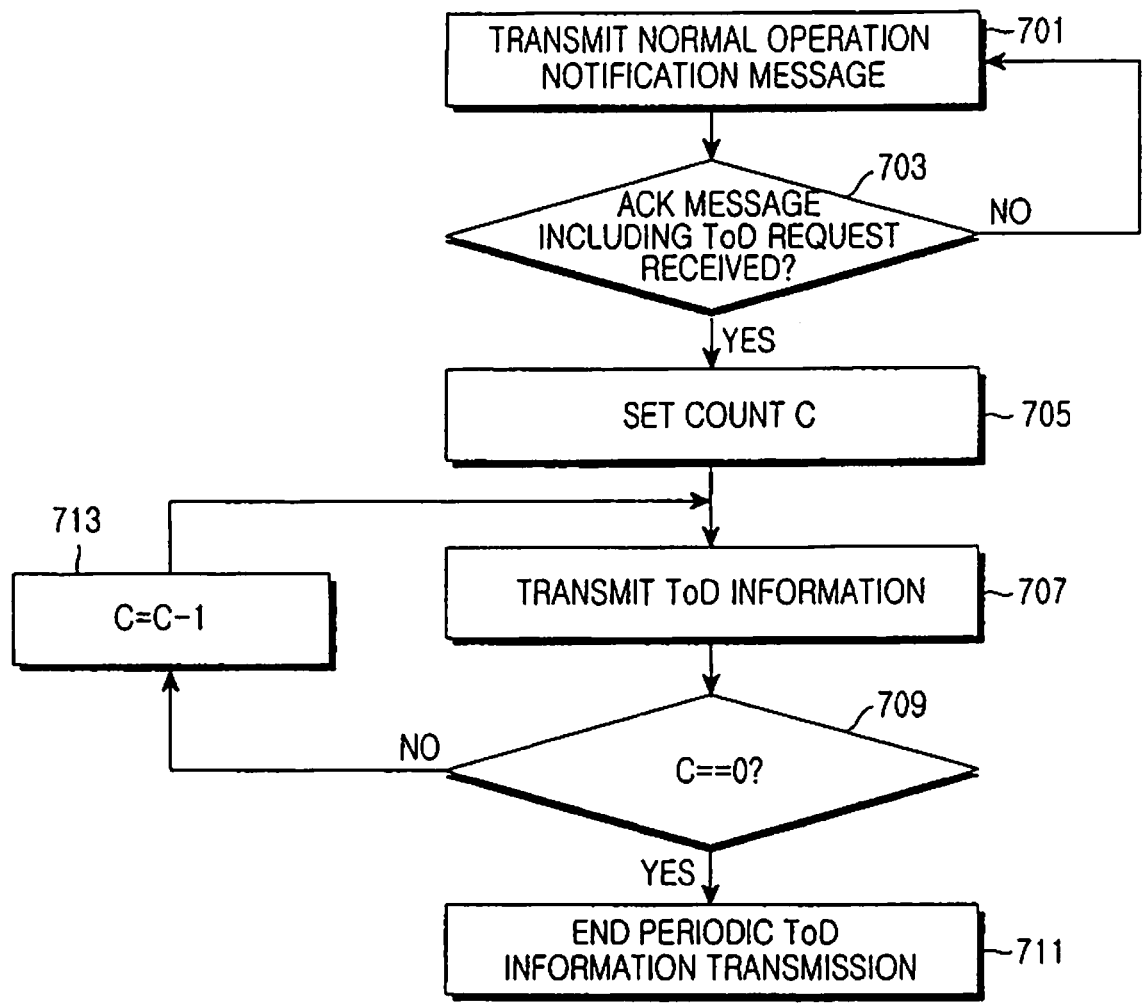
FIG. 7 is a flowchart of an operation for transmitting Time of Day (ToD) information in the BS illustrated in FIG. 1.

FIG. 7 is a flowchart of the operation for transmitting ToD information in the BS 133 illustrated in FIG. 1.

Referring to FIG. 7, the BS 133 periodically transmits a normal operation notification message to the ASN_GW 131 to indicate its normal operation in step 701. In step 703, the BS 133 monitors reception of an ACK message including a ToD request from the ASN_GW 131. If the ACK message with the ToD request has not been received, the BS 133 returns to step 701.

Upon receipt of the ACK message with the ToD request in step 703, the BS 133 sets the count C of a predetermined counter to a predetermined value N, for example 10, in step 705 and transmits ToD information to the ASN_GW 131 every predetermined period in step 707. The ToD information is piggybacked onto the normal operation notification message.

While the BS 133 periodically transmits the ToD information to the ASN_GW 131 in step 707, it can be further contemplated that an FN is generated based on the ToD information and only the FN is periodically transmitted to the ASN_GW 131. Furthermore, the BS 133 may periodically transmit both the ToD information and the FN to the ASN_GW 131. The FN generation based on the ToD information in the BS 133 will be described below.

The BS 133 is aware of an MBS start/end time preset by a service provider and transmits an MBS initiation message to the ASN_GW 131 before the MBS start time. The ASN_GW 131 replies with an MBS initiation ACK message and sets an FN to an initial value based on a current ToD. Then, the FN is increased every frame period. For instance, it is assumed that one MBS frame is 5 ms in duration.

In step 709, the BS 133 compares C with 0. If C is equal to 0, the BS 133 ends the periodic ToD information transmission in step 711.

If C is not equal to 0, the BS 133 decreases C by a predetermined value M, for example 1, in step 713 and returns to step 707.

As described with reference to FIG. 7, once the ASN_GW 131 selects the BS 133 to transmit ToD information, the BS 133 periodically transmits ToD information for a predetermined time period to the ASN_GW 131, thereby obviating the need for the ASN_GW's selecting of a BS to transmit ToD information each time the ASN_GW 131 receives normal operation notification messages from BSs.

Figure 8:
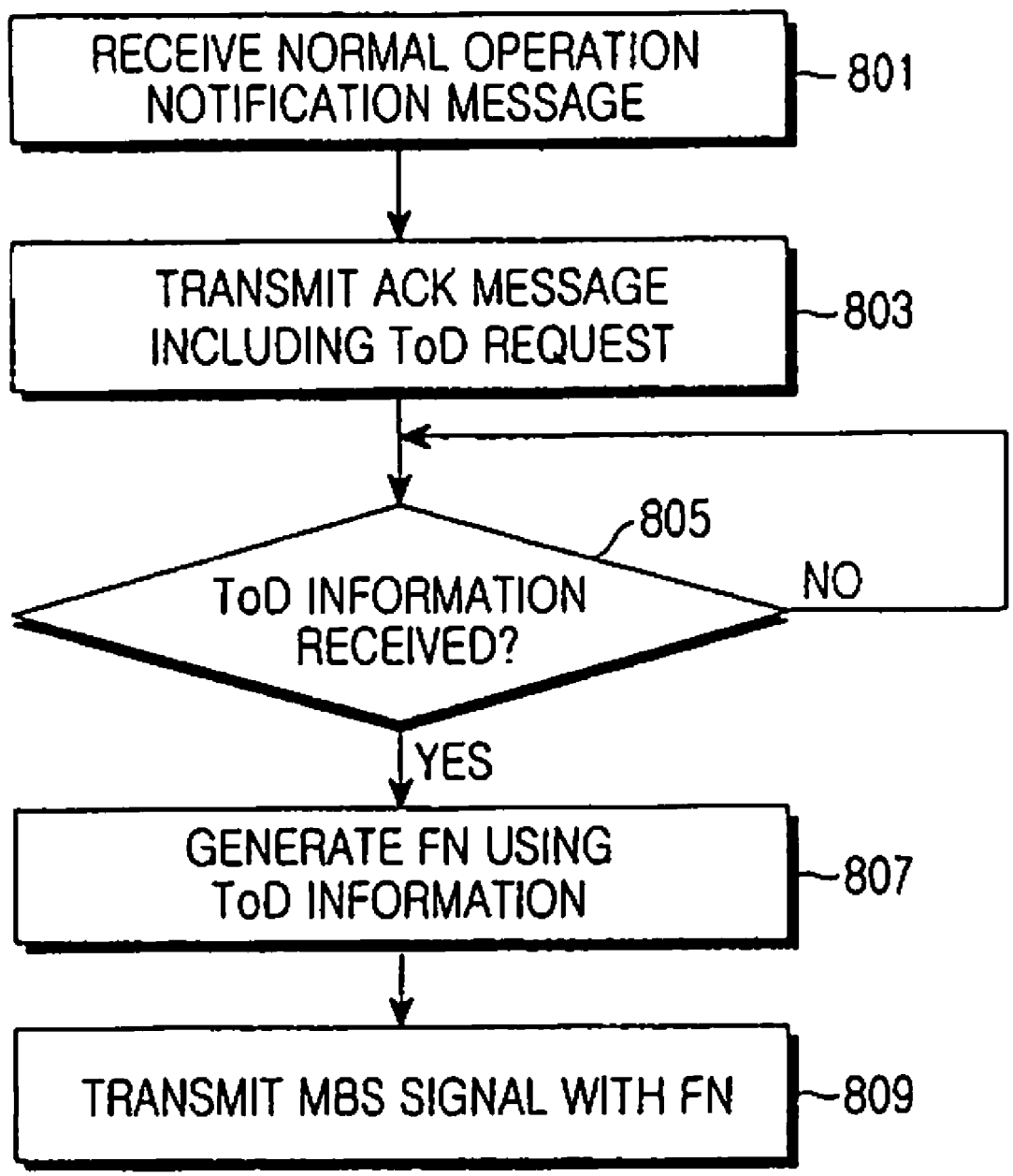
FIG. 8 is a flowchart of an operation for receiving ToD information in the ASN_GW illustrated in FIG. 1.

FIG. 8 is a flowchart of an operation for receiving ToD information in the ASN_GW 131 illustrated in FIG. 1.

Referring to FIG. 8, the ASN_GW 131 receives normal operation notification messages from all BSs connected to the ASN_GW 131 in step 801. Some BSs that do not operate normally among all the connected BSs do not transmit normal operation notification messages to the ASN_GW 131, although it is assumed herein that all the connected BSs transmit normal operation notification messages. In step 803, the ASN_GW 131 selects the BS 133 to transmit ToD information from among the BSs and transmits an ACK message including a ToD request to the BS 133. While not shown, the ASN_GW 131 transmits conventional ACK messages to the other BSs.

In step 805, the ASN_GW 131 monitors reception of ToD information from the BS 133. The ToD information is piggybacked onto a normal operation notification message. Upon receipt of the ToD information, the ASN_GW 131 generates an FN in the same FN generation rule as used in the BS 133 in step 807 and transmits an MBS signal including the FN to the BS 133 in step 809. The FN is a time stamp.

As to an operation for generating an FN based on ToD information, the ToD information represents an absolute time (e.g. 15:19:11, Oct. 15, 2006), whereas the FN represents a relative time (e.g. 50 ms after a predetermined time point). Since the FN is used in MBS signal transmission, the ASN_GW 131 should generate the FN using the ToD information to acquire timing synchronization with the BS 133 that operates on a frame basis. The ToD information can be mapped to the FN in a one-to-one correspondence for a predetermined time period according to the time resolution (e.g. 5 ms) and bit number of the FN. This is why the FN can be created using the ToD information.

While the ASN_GW 131 receives ToD information from the BS 133 and generates an FN based on the ToD information in steps 805 and 807, the ASN_GW 131 can receive only the FN or both the ToD information and the FN from the BS 133, as described before.

The ASN_GW 131 determines the size of a field that will carry an FN in an MBS signal as follows.

The number of bits required for representing 24 hours as 5-ms FNs is computed by Equation (1)

$$24 \text{ hours} \times (3600 \text{ seconds/hour})/(5 \text{ ms/frame}) = 17,280,000 \text{ frames} \quad (1)$$

Since $2^{24}=16,777,216$, FN values can be represented in 24 bits, the uniqueness of which lasts for about 23.3 hours. Taking into account an MBS provisioning time only, the field is set to 24 bits in length so as to allocate an FN whose unique value is valid for a day.

Figure 9:
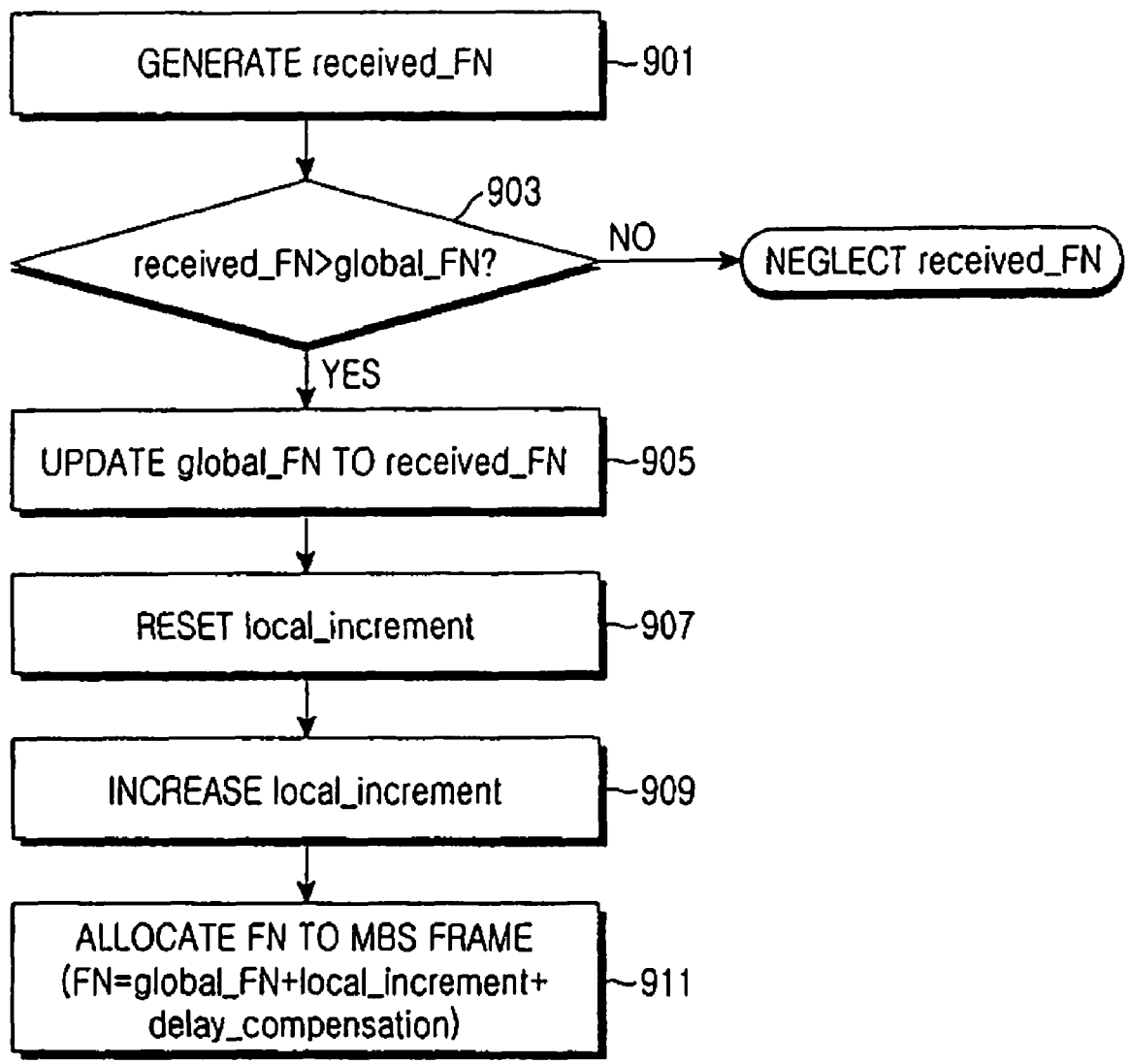
FIG. 9 is a flowchart of an operation for generating a Frame Number (FN) in the ASN_GW illustrated in FIG. 1.

FIG. 9 is a flowchart of an operation for generating an FN in the ASN_GW illustrated in FIG. 1.

Referring to FIG. 9, the ASN_GW 131 generates an FN based on ToD information received a selected BS, i.e. the BS 133 in the FN generation rule used in the BS 133 in step 901. Alternatively, the ASN_GW 131 may receive the FN directly from the BS 133. Irrespective of whether the FN is generated or received, the FN is denoted by received_FN. If the ASN_GW 131 receives ToD information or FNs from a plurality of BSs, an effective received_FN among received_FNs acquired from the BSs is referred to as global_FN and a local clock increased every 5 ms is referred to as local_increment.

In step 903, the ASN_GW 131 compares the received_FN with a current global_FN. If the received_FN is less than or equal to the global_FN, the ASN_GW 131 neglects the received_FN. If the received_FN exceeds the current global_FN, the ASN_GW 131 updates the global_FN to the received_FN in step 905 and resets local_increment to 0 in step 907. Thus, the first ToD information received from the BSs, that is, the ToD information from a BS with a minimum transmission delay is determined as a reference ToD.

The ASN_GW 131 increases local_increment by a predetermined value, for example 1, each time a local clock is generated every 5 ms being a Time Division Duplexing (TDD) frame time duration, before including the FN in an MBS signal in step 909. This is done to reflect local_increment counted over time with respect to the received_FN in an FN that will be included in the current MBS signal, to thereby increase the accuracy of timing synchronization of the MBS signal. Local_increment is represented as a count of a ToD transmission period in predetermined time units and the count increases according to the number of local clock generations over time. For example, if the ToD information transmission period is 2 sec, 2 sec is counted in units of 5 ms and the count ranges from 0 to 400. In this case, local_increment is represented in at least 9 bits and the use of the local clock leads to ToD information with a resolution required for reliable MBS provisioning.

Assuming that the BS 133 transmits the MBS signal in frames, the ASN_GW 131 should include an FN in every frame, for timing synchronization between frames. Therefore, the ASN_GW 131 allocates an FN to a current MBS frame in step 911, by Equation (2)

$$FN = global\_FN + local\_increment + delay\_compensation \quad (2)$$

Delay_compensation is computed by Equation (3), taking into account a ToD (or FN, or both FN and ToD) transmission delay between the BS 133 and the ASN_GW 131 and an MBS traffic transmission delay between the BS 133 and the ASN_GW 131.

$$delay\_compensation = max\_tolerable\_delay / local\_clock\_resolution \quad (3)$$

where max_tolerable_delay is calculated using the ToD transmission delay and the MBS traffic transmission delay, and local_clock_resolution can be 5 ms, for example. If max_tolerable_delay is set sufficiently high, this prevents a timing synchronization failure such as arrival of an MBS signal that should have been transmitted already from the BS. However, the high max_tolerable_delay increases a buffer size in the BS.

As stated before, the MS can acquire a macro diversity gain only if all BSs within the same MBS zone transmit the same MBS signal at the same time. Nonetheless, there are no specified packetization operation methods for MBS signals in the Mobile WiMAX communication system. Hence, the present invention proposes a packetization operation method for MBS signals in the Mobile WiMAX communication system.

Figure 10:
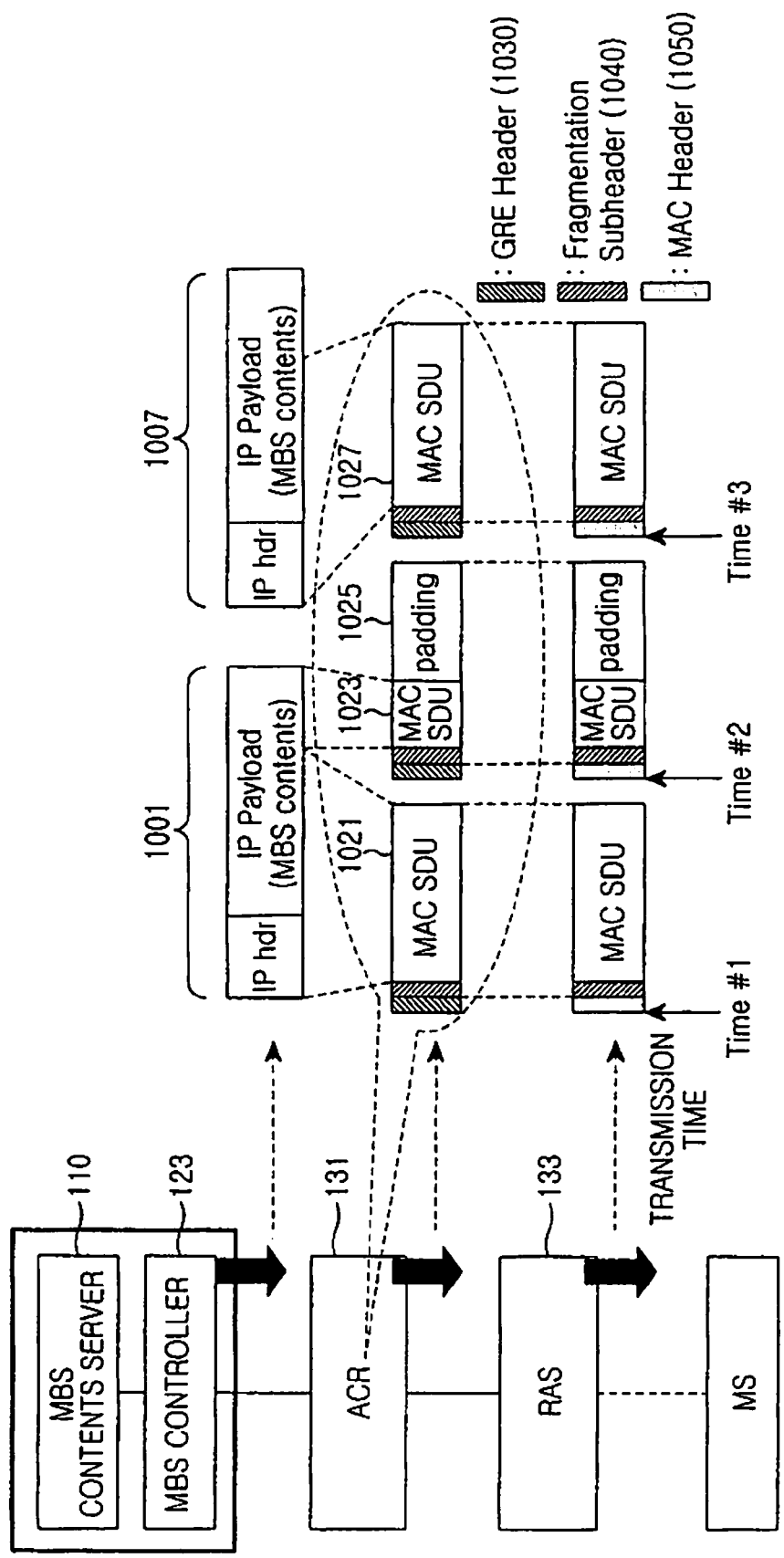
FIG. 10 illustrates an MBS signal flow during transmission/reception of MBS signals, when the ASN_GW performs packetization operation based on radio information received from an upper layer in the Mobile WiMAX communication system according to an exemplary embodiment of the present invention.

FIG. 10 illustrates an MBS signal flow during transmission/reception of MBS signals, when the ASN_GW performs packetization operation based on radio information received from an upper layer in the Mobile WiMAX communication system according to an exemplary embodiment of the present invention. Herein, the packetization operation includes packing, fragmentation and padding operation.

Referring to FIG. 10, the ASN_GW 131 receives an MBS signal from the MBS server 123 and performs packetization operation in a manner suitable for content-based timing synchronization and a MAC frame burst size. For the packetization operation, the ASN_GW 131 can receive necessary radio information from the content server 110 or the MBS server 123. The radio information includes the number of channels for the MBS, capacity requirements of the individual channels, and RF scheduling information. The RF scheduling information may change adaptively according to system situations.

Regarding packetization operation, the ASN_GW 131 receives MBS traffic 1001 and MBS traffic 1007 from the MBS server 123 and determines an MBS payload size based on the radio information received from the upper layer. The ASN_GW 131 then fragments MBS payload to a burst size 1021 in a MAC frame on a content basis. If MBS payload less than the burst size 1021 results from the fragmentation, the MBS payload is subject to zero padding 1025. Herein, the BS can perform the padding operation. The ASN_GW 131 adds the fragments with a Fragmentation Subheader 1040 indicating if fragmentation has been performed and a GRE header 1030 including the result of the packetization operation, prior to transmission. The result of the packetization operation includes information on whether packing and fragmentation exits and SDU size after packetization operation. Also, the GRE header can include the time stamp. One hand, the result of the packetization operation and the time stamp can be included in a new header different from the GRE header. The headers will be described later in more detail.

Figure 11:
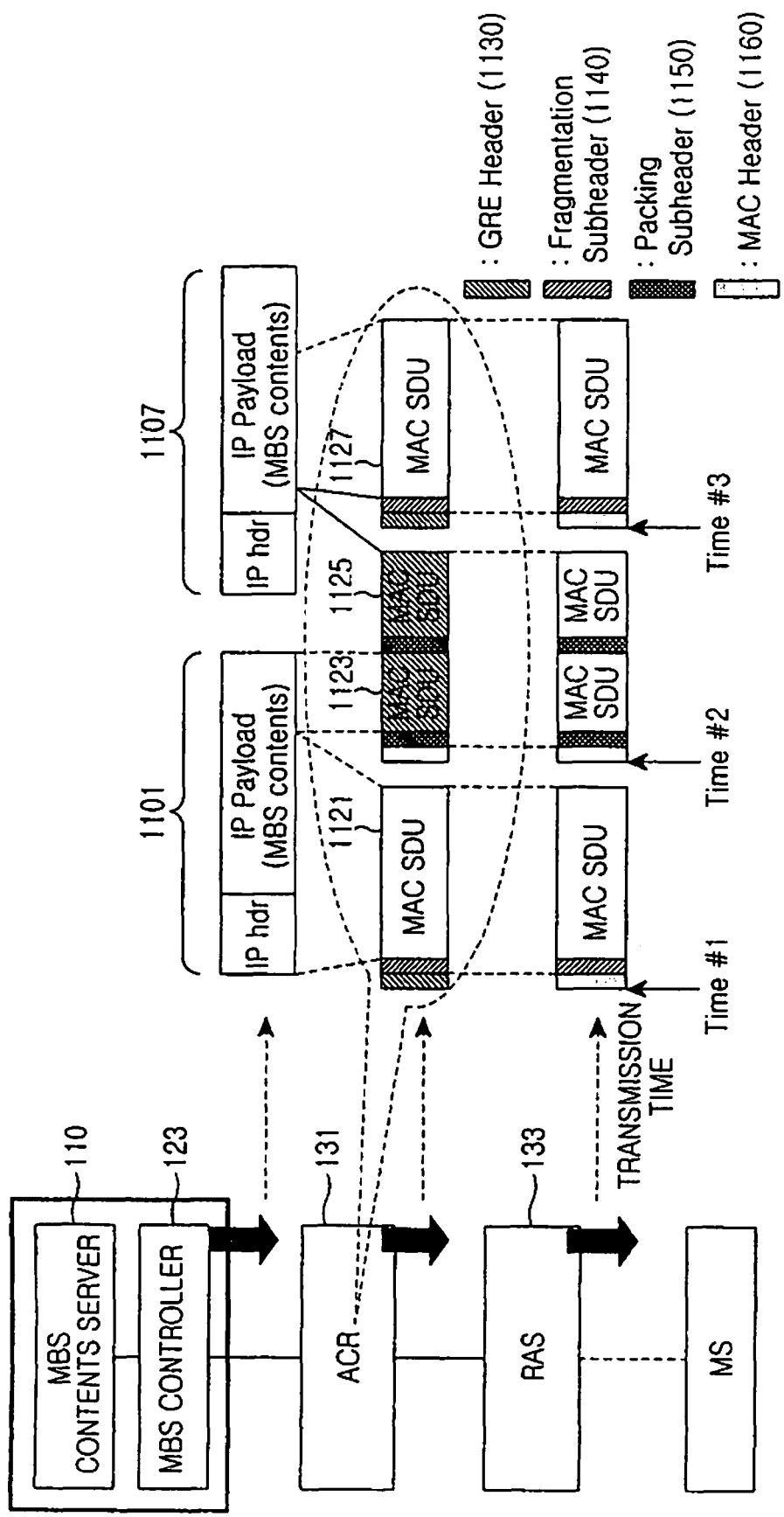
FIG. 11 illustrates an MBS signal flow during transmission/reception of MBS signals, when the ASN_GW performs packetization operation based on radio information received from the upper layer in the Mobile WiMAX communication system according to another exemplary embodiment of the present invention.

FIG. 11 illustrates an MBS signal flow during transmission/reception of MBS signals, when the ASN_GW performs packetization operation based on radio information received from the upper layer in the Mobile WiMAX communication system according to another exemplary embodiment of the present invention.

Before describing FIG. 11, it is noted that the packetization operation illustrated in FIG. 11 is similar to that illustrated in FIG. 10, except that packing substitutes for zero padding.

Referring to FIG. 11, the ASN_GW 131 receives MBS traffic 1001 from the MBS server 123 and determines an MBS payload size 1121 based on radio information received from the upper layer. The ASN_GW 131 then fragments MBS payload to the burst size 1121 in a MAC frame on a content basis. If MBS payload less than the burst size 1121 results from the fragmentation, the ASN_GW 131 packs the MBS payload with part 1125 of the next MBS traffic 1107. The ASN_GW 131 adds the fragments with a Fragmentation Subheader 1140 indicating if fragmentation has been performed, a Packing Subheader 1150 indicating if packing has been performed, and a GRE header 1130 timing synchronization information and the result of the packetization operation, prior to transmission. The headers will be described later in more detail.

The ASN_GW 131 performs content synchronization for macro diversity. The ASN_GW 131 processes received MBS traffic by fragmentation and packing/padding, for packetization operation. For the packetization operation, a packing algorithm is performed according to the transmission rate of the MBS traffic, as follows.

(1) If the data rate corresponds to a packet size less than or equal to a MAC frame burst size, the ASN_GW 131 performs packing or zero padding.

(2) If the data rate corresponds to a packet size greater than the MAC frame burst size, the ASN_GW 131 fragments the MBS traffic and performs packing or zero padding on the remaining MBS packet resulting from the fragmentation.

Figure 12:
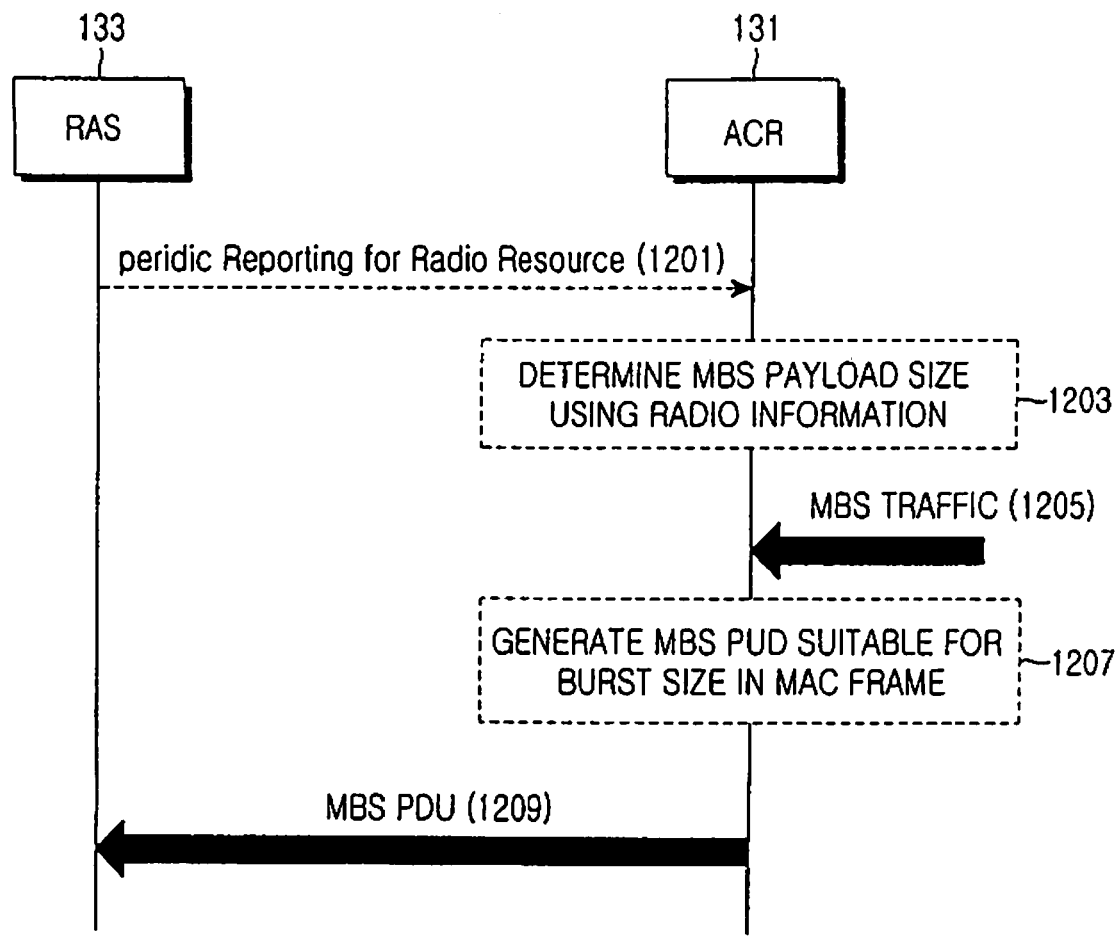
FIG. 12 is a diagram illustrating a signal flow for transmitting and receiving MBS signals according to an exemplary embodiment of the present invention, when the ASN_GW performs packetization operation based on radio information received from the BS in the Mobile WiMAX communication system.

FIG. 12 is a diagram illustrating a signal flow for transmitting and receiving MBS signals according to an exemplary embodiment of the present invention, when the ASN_GW performs packetization operation based on radio information received from the BS in the Mobile WiMAX communication system.

Referring to FIG. 12, the BS 133 transmits radio information periodically to the ASN_GW 131 in step 1201. Instead of the periodic report, the BS 133 may report the radio information, only when needed. The radio information transmitted from the BS 133 may be identical to or different from the radio information transmitted from the upper layer. In step 1203, the ASN_GW 131 determines an MBS payload size based on the radio information. The ASN_GW 131 then receives MBS traffic from the upper layer in step 1205 and generates payload suitable for the MAC frame burst size, for packetization operation in step 1207. When the packetization operation is completed, the ASN_GW 131 transmits the generated MAC Session Data Unit (SDU) to the BS 133. Herein, a packet unit in a MAC layer can be called as the SDU, and a packet unit including the SDU and an overhead in air as a PHYsical (PHY) layer can be called as a PDU. Herein, the PDU is transmitted/received in the air. The SDU represents a result of packetization for packets received in the ASN_GW from a CSN. The SDU does not include the overhead including a time stamp, information on whether packetization exits, and a size. An operation after transmission of the SDU is the same as the operation described in FIGS. 10 and 11, so a detailed description will be omitted. The packetization operation has been described before with reference to FIGS. 10 and 11 and will not further be described herein.

In the present invention, a GRE header, for example, carries the result of the packetization operation. It is to be clearly understood that another tunneling header can carry the packetization operation result, instead of the GRE header.

Figure 13:
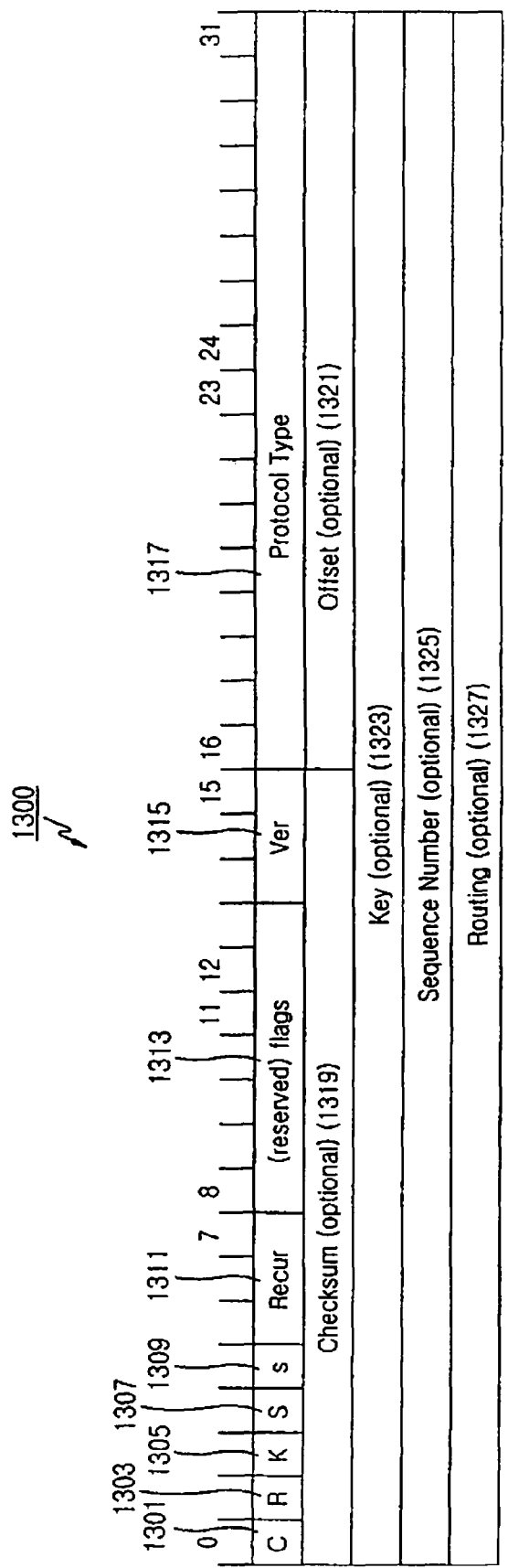
FIG. 13 illustrates the format of a Generic Routing Encapsulation (GRE) header for transmitting a packetization operation result according to an exemplary embodiment of the present invention.

FIG. 13 illustrates the format of the GRE header for transmitting a packetization operation result according to an exemplary embodiment of the present invention.

Referring to FIG. 13, a GRE header 1300 includes upper eight bits of flags, followed by option fields whose inclusion depends on the values of the flags.

A Checksum (C) field 1301 includes Internet Protocol (IP) packets of the GRE header and payload packets. An Offset & Routing (R) field 1303 indicates an offset from the start of the R field 1303 to an available Source Route Entry. A Key (K) field 1305 indicates an identifier specific to each traffic flow to establish a GRE tunnel. A Sequence Number (S) field 1037 provides information for ensuring a packet sequence. A Strict Source Route (s) field 1309 indicates whether "List of Source Route Entries" are included in the R field 1303. A Recursion Control (Recur) field 1311 indicates the number of allowed encapsulations. A Reserved flag field 1313 is 5 bits in length. Two bits out of the five bits are used to provide packetization operation result information according to the present invention. For example, if the two bits are 00, it means that fragmentation/packing has not been performed. If they are 01, it means that packing has been performed. If they are 10, it means that fragmentation/zero padding has been performed. If they are 11, it means that fragmentation/packing has been performed. A Version field 1315 indicates the version of the GRE header, and A Protocol Type field 1317 indicates the type of GRE payload included in the GRE tunnel. The GRE payload type can be IP, Ethernet, or the like.

Figure 14:
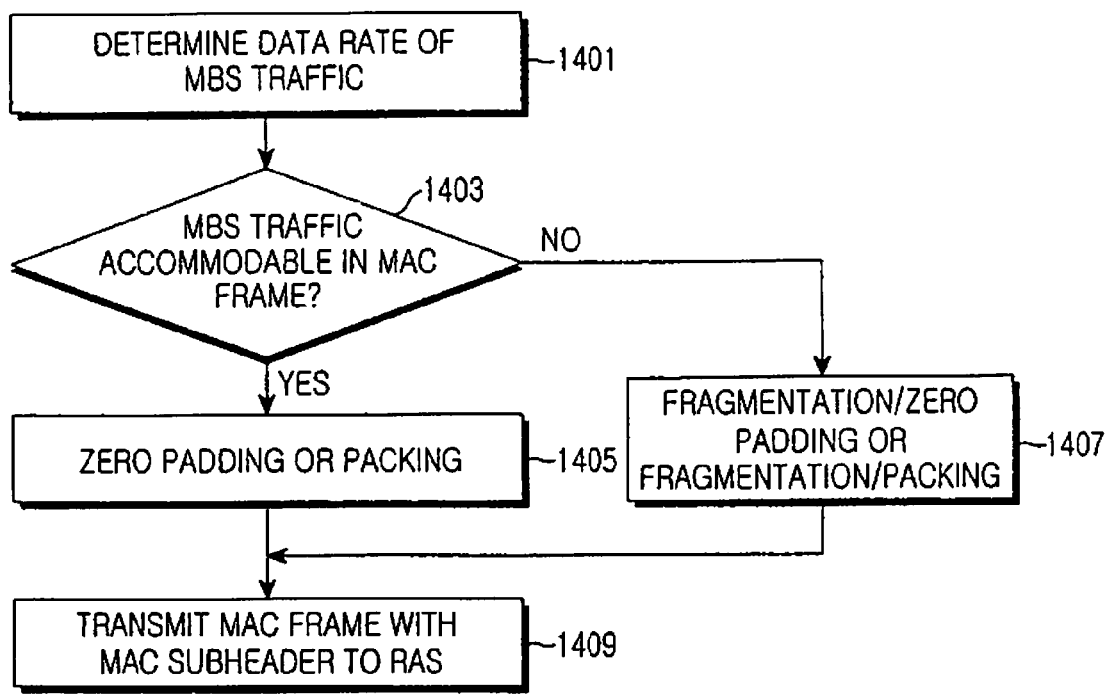
FIG. 14 is a flowchart of a packetization operation in the ASN_GW in the Mobile WiMAX communication system according to an exemplary embodiment of the present invention.

FIG. 14 is a flowchart of the packetization operation in the ASN_GW in the Mobile WiMAX communication system according to an exemplary embodiment of the present invention.

Referring to FIG. 14, upon receipt of MBS traffic, the ASN_GW 131 determines the data rate of the MBS traffic based on radio information received from the upper layer or the BS 133 in step 1401. In step 1403, the ASN_GW 131 determines if the received MBS traffic can be included in a MAC frame, for packetization operation. If the MBS traffic can be accommodated in the MAC frame, the ASN_GW 131 performs zero padding or packing according to a system policy in step 1405 and proceeds to step 1409.

If the MBS traffic is too large for the MAC frame in step 1403, the ASN_GW 131 processes the MBS traffic by fragmentation/zero padding or fragmentation/packing according to the system policy in step 1407. In step 1409, the ASN_GW 131 generates a MAC subheader including the result of the packetization operation and transmits the MAC frame with the MAC subheader to the BS 133.

As is apparent from the above description, the exemplary embodiments of the present invention offer the following benefits.

(1) As MBS signals are transmitted/received after timing synchronization, an MBS is provided efficiently in a Mobile WiMAX communication system. Especially, a macro diversity gain is achieved during the MBS signal transmission/reception.

(2) Since an MBS server or an ASN_GW generates a time stamp for use in timing synchronization between MBS signals, an MBS can be provided adaptively according to the needs of the Mobile WiMAX communication system.

(3) Time stamps are generated based on time information received from BSs. Therefore, the reliability of timing synchronization is increased during MBS signal transmission/reception.

(4) Time stamp-based MBS signal packetization and transmission/reception leads to efficient MBS provisioning in the Mobile WiMAX communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for processing multicast/broadcast signals by an Access Service Network GateWay (ASN_GW) in a communication system, comprising:

generating a first multicast/broadcast signal using a received second multicast/broadcast signal and information about a zone in which the same service is provided;

generating a frame number using Time of Day (ToD) information; and transmitting, to a Base Station (BS) connected to the ASN_GW, the first multicast/broadcast signal and the frame number, wherein generating the first multicast/broadcast signal includes performing a packetization operation on the second multicast/broadcast signal using Radio Frequency (RF) scheduling information, wherein transmitting the first multicast/broadcast signal and the frame number to the BS includes transmitting information indicating a result of the packetization operation to the BS, wherein the frame number is time information indicating a time for the BS to transmit the first multicast/broadcast signal, wherein the RF scheduling information includes Modulation and Coding Scheme (MCS) level information, wherein the ToD information is received from the BS, and is acquired from a Global Positioning System (GPS) included in the BS, wherein, if the communication system includes a plurality of BSs, generating the frame number using the ToD comprises generating the frame number using a global_Frame Number (FN), and wherein the global_FN represents an effective received_FN among received_FNs received from the plurality of BSs.

2. The method of claim 1, wherein, if the communication system includes the plurality of BSs, generating the frame number using the ToD information further comprises:

generating the frame number using the global_FN, a local_increment, and a delay_compensation, wherein the local_increment represents a local clock increased every a predetermined interval, and the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

3. The method of claim 2, wherein the delay_compensation is determined using a max_tolerable_delay and a local_clock_resolution, the max_tolerable_delay is determined using the ToD transmission delay between the BS and the ASN_GW, and the multicast/broadcast signal transmission delay between the BS and the ASN_GW, and the local_clock_ resolution is determined using a predetermined interval.

4. The method of claim 1, wherein the RF scheduling information is received from an upper layer.

5. The method of claim 4, wherein the upper layer is one of a Multicast/Broadcast Service (MBS) server and a content server.

6. The method of claim 1, wherein the communication system includes a plurality of zones including the zone, and the zone includes a plurality of ASN_GWs including the ASN_GW and a plurality of BSs connected to the ASN_GW.

7. A method for processing multicast/broadcast signals by a Base Station (BS) in a communication system, comprising:
receiving a multicast/broadcast signal, information indicating a result of a packetization operation, and time information from an Access Service Network GateWay (ASN_GW), the time information indicating a time for the BS to transmit the multicast/broadcast signal; and
transmitting the multicast/broadcast signal according to the time information, wherein the time information is a frame number generated by the ASN_GW, using Time of Day (ToD) information,
wherein the information indicating the result of the packetization operation is generated, by the ASN_GW, by performing the packetization operation on the multicast/broadcast signal using Radio Frequency (RF) scheduling information, and
wherein the RF scheduling information includes Modulation and Coding Scheme (MCS) level information,
wherein the ToD information is acquired from a Global Positioning System (GPS) included in the BS,
wherein, if the communication system includes a plurality of BSs, the frame number is generated, by the ASN_GW, using a global_Frame Number (FN), and
wherein the global_FN represents an effective received_FN among received_FNs received from the plurality of BSs.

8. The method of claim 7, wherein, if the communication system includes the plurality of BSs, the frame number is generated, by the ASN_GW, using the global_FN, a local_increment, and a delay_compensation, and
wherein the local_increment represents a local clock increased every a predetermined interval, and the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

9. The method of claim 8, wherein the delay_compensation is determined using a max_tolerable_delay and a local_clock_resolution, the max_tolerable_delay is determined using the ToD transmission delay between the BS and the ASN_GW, and the multicast/broadcast signal transmission delay between the BS and the ASN_GW, and the local_clock_ resolution is determined using a predetermined interval.

10. The method of claim 7, wherein the RF scheduling information is received, by the ASN_GW, from an upper layer.

11. The method of claim 10, wherein the upper layer is one of a Multicast/Broadcast Service (MBS) server and a content server.

12. An Access Service Network GateWay (ASN_GW) for processing multicast/broadcast signals in a communication system, comprising:
a controller for generating a first multicast/broadcast signal using a received second multicast/broadcast signal and information about a zone in which the same service is provided, generating a frame number using Time of Day (ToD) information;
a receiver for receiving the second multicast/broadcast signal; and
a transmitter for transmitting, to a Base Station (BS) connected to the ASN_GW, the first multicast/broadcast signal and the frame number,
wherein the frame number is time information indicating a time for the BS to transmit the first multicast/broadcast signal,
wherein the controller performs a packetization operation for the second multicast/broadcast signal using Radio Frequency (RF) scheduling information, and the transmitter transmits information indicating a result of the packetization operation to the BS, and
wherein the RF scheduling information includes Modulation and Coding Scheme (MCS) level information,
wherein the ToD information is received from the BS, and is acquired from a Global Positioning System (GPS) included in the BS,
wherein, if the communication system includes a plurality of BSs, the ASN_GW generates the frame number using a global$_{13}$ Frame Number (FN), and
wherein the global_FN represents an effective received_FN among received_FNs received from the plurality of BSs.

13. The ASN_GW of claim 12, wherein, if the communication system includes the plurality of BSs, the ASN_GW generates the frame number using the global_FN, a local_increment, and a delay_compensation,
wherein the local_increment represents a local clock increased every a predetermined interval, and the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

14. The ASN_GW of claim 13, wherein the delay_compensation is determined using a max_tolerable_delay and a local_clock_resolution, the max_tolerable_delay is determined using the ToD transmission delay between the BS and the ASN_GW, and the multicast/broadcast signal transmission delay between the BS and the ASN_GW, and the local_clock_resolution is determined using a predetermined interval.

15. The ASN_GW of claim 12, wherein the RF scheduling information is received from an upper layer.

16. The ASN_GW of claim 15, wherein the upper layer is one of a Multicast/Broadcast Service (MBS) server and a content server.

17. The ASN_GW of claim 12, wherein the communication system includes a plurality of zones including the zone, and the zone includes a plurality of ASN_GWs including the ASN_GW and a plurality of BSs connected to the ASN_GW.

18. A Base Station (BS) for multicast/broadcast signals in a communication system, comprising:
a receiver for receiving a multicast/broadcast signal, information indicating a result of a packetization operation, and time information from an Access Service Network GateWay (ASN_GW), the time information indicating a time for the BS to transmit the multicast/broadcast signal; and
a transmitter for transmitting the multicast/broadcast signal according to the time information, wherein the time information is a frame number generated, by the ASN_GW, using Time of Day (ToD) information, wherein the information indicating the result of the packetization operation is generated, by the ASN_GW, by performing the packetization operation on the multicast/broadcast signal using Radio Frequency (RF) scheduling information, wherein the RF scheduling information includes Modulation and Coding Scheme (MCS) level information, wherein the ToD information is acquired from a Global Positioning System (GPS) included in the BS, wherein, if the communication system includes a plurality of BSs, the frame number is generated, by the ASN_GW, using a global_Frame Number (FN), and wherein the global_FN represents an effective received_FN among received_FNs received from the plurality of BSs.

19. The BS of claim 18, wherein, if the communication system includes the plurality of BSs, the frame number is generated, by the ASN_GW, using the global_FN, a local_increment, and a delay_compensation, wherein the local_increment represents a local clock increased every a predetermined interval, and the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

20. The BS of claim 19, wherein the delay_compensation is determined using a max_tolerable_delay and a local_clock_resolution, the max_tolerable_delay is determined using the ToD transmission delay between the BS and the ASN_GW, and the multicast/broadcast signal transmission delay between the BS and the ASN_GW, and the local_clock_resolution is determined using a predetermined interval.

21. The BS of claim 18, wherein the RF scheduling information is received, by the ASN_GW, from an upper layer.

22. The BS of claim 21, wherein the upper layer is one of a Multicast/Broadcast Service (MBS) server and a content server.

23. A method for processing multicast/broadcast signals by an Access Service Network GateWay (ASN_GW) in a communication system, comprising:

generating a first multicast/broadcast signal using a received second multicast/broadcast signal and information about a zone in which the same service is provided;

generating a frame number using Time of Day (ToD) information; and transmitting, to a Base Station (BS) connected to the ASN_GW, the first multicast/broadcast signal and the frame number, wherein generating the first multicast/broadcast signal includes performing a packetization operation on the second multicast/broadcast signal using Radio Frequency (RF) scheduling information, wherein transmitting the first multicast/broadcast signal and the frame number to the BS includes transmitting information indicating a result of the packetization operation to the BS, wherein the frame number is time information indicating a time for the BS to transmit the first multicast/broadcast signal.

wherein the RF scheduling information includes Modulation and Coding Scheme (MCS) level information, wherein the ToD information is received from the BS. and is acquired from a Global Positioning System (GPS) included in the BS, wherein, if the communication system includes a plurality of BSs, generating the frame number using the ToD information comprises:

generating the frame number using

FN =global_FN +local_increment +delay_compensation , and wherein the FN represents the frame number, the global_FN represents an effective received_FN among received_FNs received from the plurality of BSs, the local_increment represents a local clock increased every a predetermined interval, the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

24. The method of claim 23, wherein the delay_compensation represents is determined using delay_compensation=max_tolerable_delay/local_clock_resolution , wherein the max_tolerable_delay is determined using the ToD transmission delay between the BS and the ASN_GW, and the multicast/broadcast signal transmission delay between the BS and the ASN_GW, and the local_clock_resolution is determined using a predetermined interval.

25. A method for processing multicast/broadcast signals by a Base Station (BS) in a communication system, comprising:

receiving a multicast/broadcast signal, information indicating a result of a packetization operation, and time information from an Access Service Network GateWay (ASN_GW), the time information indicating a time for the BS to transmit the multicast/broadcast signal: and transmitting the multicast/broadcast signal according to the time information, wherein the time information is a frame number generated by the ASN_GW, using Time of Day (ToD) information, wherein the information indicating the result of the packetization operation is generated, by the ASN_GW, by performing the packetization operation on the multicast/broadcast signal using Radio Frequency (RF) scheduling information, wherein the RF scheduling information includes Modulation and Coding Scheme (MCS) level information, wherein the ToD information is acquired from a Global Positioning System (GPS) included in the BS, wherein, if the communication system includes a plurality of BSs, the frame number is generated, by the ASN_GW using FN=global_FN+local_increment+delay_compensation , and wherein the FN represents the frame number, the global_FN represents an effective received_FN among received_FNs received from the plurality of BSs, the local_increment represents a local clock increased every a predetermined interval, the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

26. The method of claim 25, wherein the delay_compensation represents is determined using delay_compensation=max_tolerable_delay/local_clock_resolution , wherein the max_tolerable_delay is determined using the ToD transmission delay between the BS and the ASN_GW, and the multicast/broadcast signal transmission delay between the BS and the ASN_GW, and the local_clock_resolution is determined using a predetermined interval.

27. An Access Service Network GateWay (ASN_GW) for processing multicast/broadcast signals in a communication system, comprising:
- a controller for generating a first multicast/broadcast signal using a received second multicast/broadcast signal and information about a zone in which the same service is provided, generating a frame number using Time of Day (ToD) information;
- a receiver for receiving the second multicast/broadcast signal; and a transmitter for transmitting, to a Base Station (BS) connected to the ASN_GW, the first multicast/broadcast signal and the frame number,
- wherein the frame number is time information indicating a time for the BS to transmit the first multicast/broadcast signal,
- wherein the controller performs a packetization operation for the second multicast/broadcast signal using Radio Frequency (RF) scheduling information, and the transmitter transmits information indicating a result of the packetization operation to the BS,
- wherein the RF scheduling information includes Modulation and Coding Scheme (MCS) level information,
- wherein the ToD information is received from the BS, and is acquired from a Global Positioning System (GPS) included in the BS,
- wherein, if the communication system includes a plurality of BSs, the ASN_GW generates the frame number using FN=global_FN+local_increment+delay_compensation, and
- wherein the FN represents the frame number, the global_FN represents an effective received_FN among received_FNs received from the plurality of BSs, the local_increment represents a local clock increased every a predetermined interval, the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

28. The ASN_GW of claim 27, wherein the delay_compensation represents is determined using
delay_compensation=max_tolerable_delay/local_clock_resolution ,
wherein the max_tolerable_delay is determined using the ToD transmission delay between the BS and the ASN_GW, and the multicast/broadcast signal transmission delay between the BS and the ASN_GW, and the local_clock_resolution is determined using a predetermined interval.

29. A Base Station (BS) for multicast/broadcast signals in a communication system, comprising:
- a receiver for receiving a multicast/broadcast signal, information indicating a result of a packetization operation, and time information from an Access Service Network GateWay (ASN_GW), the time information indicating a time for the BS to transmit the multicast/broadcast signal; and
- a transmitter for transmitting the multicast/broadcast signal according to the time information,
- wherein the time information is a frame number generated, by the ASN_GW, using Time of Day (ToD) information,
- wherein the information indicating the result or the packetization operation is generated, by the ASN_GW, by performing the packetization operation on the multicast/broadcast signal using Radio Frequency (RF) scheduling information,
- wherein the RF scheduling information includes Modulation and Coding Scheme (MCS) level information,
- wherein the ToD information is acquired from a Global Positioning System (GPS) included in the BS,
- wherein, if the communication system includes a plurality of BSs, the frame number is generated, by the ASN_GW using
FN=global_FN+local_increment+delay_compensation, and
- wherein the FN represents the frame number, the global_FN represents an effective received_FN among received_FNs received from the plurality of BSs, the local_increment represents a local clock increased every a predetermined interval, the delay_compensation represents a value determined using one of a ToD transmission delay between the BS and the ASN_GW, and an FN and ToD transmission delay between the BS and the ASN_GW, and a multicast/broadcast signal transmission delay between the BS and the ASN_GW.

30. The BS of claim 29, wherein the delay_compensation represents is determined using
delay_compensation=max_tolerable_delay/local_clock_resolution ,
wherein the max_tolerable_delay is determined using the ToD transmission delay between the BS and the ASN_GW, and the multicast/broadcast signal transmission delay between the BS and the ASN_GW, and the local_clock_resolution is determined using a predetermined interval.

* * * * *